US012244087B2

(12) United States Patent
Hirose

(10) Patent No.: US 12,244,087 B2
(45) Date of Patent: Mar. 4, 2025

(54) FEMALE TERMINAL

(71) Applicant: SUMITOMO WIRING SYSTEMS, LTD., Mie (JP)

(72) Inventor: Yuki Hirose, Mie (JP)

(73) Assignee: SUMITOMO WIRING SYSTEMS, LTD., Mie (JP)

(*) Notice: Subject to any disclaimer, the term of this patent is extended or adjusted under 35 U.S.C. 154(b) by 326 days.

(21) Appl. No.: 17/891,178

(22) Filed: Aug. 19, 2022

(65) Prior Publication Data

US 2023/0058587 A1 Feb. 23, 2023

(30) Foreign Application Priority Data

Aug. 23, 2021 (JP) ................................ 2021-135538

(51) Int. Cl.
*H01R 13/11* (2006.01)
*H01R 4/18* (2006.01)
*H01R 4/48* (2006.01)
*H01R 13/05* (2006.01)
*H01R 13/24* (2006.01)

(52) U.S. Cl.
CPC ............. *H01R 13/113* (2013.01); *H01R 4/18* (2013.01); *H01R 4/48* (2013.01); *H01R 13/05* (2013.01); *H01R 13/2407* (2013.01)

(58) Field of Classification Search
CPC ........................ H01R 13/11–17; H01R 13/187
See application file for complete search history.

(56) References Cited

U.S. PATENT DOCUMENTS 9,236,675 B2 * 1/2016 Tsuji .................... H01R 13/187
2016/0079686 A1 3/2016 Shinmi
2017/0054237 A1 * 2/2017 Uezono ................ H01R 13/115

* cited by examiner

*Primary Examiner* — Tulsidas C Patel
*Assistant Examiner* — Carlos E Lopez-Pagan
(74) *Attorney, Agent, or Firm* — Venjuris, P.C.

(57) ABSTRACT

The connecting tube portion 20 has a bottom wall 22, an upper wall 24 facing the bottom wall 22 and a front opening 21 open forward. The resilient contact piece 50 includes a fulcrum portion 51 folded rearward from a front end edge of the bottom wall 22 in the connecting tube portion 20 and a contact point portion 54 provided at a position behind the fulcrum portion 51 to contact the male terminal 80. The auxiliary spring 70 is disposed at a position behind the fulcrum portion 51 and below the contact point portion 54. The auxiliary spring 70 includes protrusions 75 projecting in a direction intersecting the front-rear direction. The protrusions 75 and an inner surface of the upper wall 24 are visually confirmable through the front opening 21 of the connecting tube portion 20.

4 Claims, 13 Drawing Sheets

FEMALE TERMINAL

CROSS-REFERENCE TO RELATED APPLICATIONS

This application is based on and claims priority from Japanese Patent Application No. 2021-135538, filed on Aug. 23, 2021, with the Japan Patent Office, the disclosure of which is incorporated herein in its entirety by reference.

TECHNICAL FIELD

The present disclosure relates to a female terminal.

BACKGROUND

Conventionally, a female terminal is known from Japanese Patent Laid-open Publication No. 2016-062710. This female terminal includes a connecting tube portion into which a male terminal is inserted. A resilient contact piece to be resiliently held in contact with the male terminal is provided inside the connecting tube portion. The male terminal is electrically connected to the female terminal by being sandwiched between the resilient contact piece and the upper wall of the connecting tube portion.

Further, an auxiliary spring for biasing the resilient contact piece toward the male terminal by contacting the resilient contact piece is provided inside the connecting tube portion. Since a contact pressure between the resilient contact piece and the male terminal is improved by being biased by this auxiliary spring, the electrical connection reliability of the female terminal and the male terminal is improved.

SUMMARY

To improve the electrical connection reliability of the female terminal and the male terminal, it is important to control the strength of the auxiliary spring for biasing the resilient contact piece. To that end, it is important to inspect and control the relative arrangement of the auxiliary spring and the upper wall of the connecting tube portion.

However, since the auxiliary spring is disposed in the connecting tube portion and hidden below the resilient contact piece, it is difficult to inspect the relative arrangement of the auxiliary spring and the upper wall of the connecting tube portion from outside.

The present disclosure was completed on the basis of the above situation and aims to provide a female terminal enabling an inspection of the arrangement of an auxiliary spring in a connecting tube portion.

The present disclosure is directed to a female terminal to be connected to a male terminal, the female terminal being provided with a connecting tube portion extending in a front-rear direction, the male terminal being inserted into the connecting tube portion, a resilient contact piece provided in the connecting tube portion, the resilient contact piece resiliently contacting the male terminal, and an auxiliary spring disposed in the connecting tube portion, the auxiliary spring biasing the resilient contact piece toward the male terminal by contacting the resilient contact piece, wherein the connecting tube portion has a bottom wall, an upper wall facing the bottom wall and a front opening open forward, the resilient contact piece includes a fulcrum portion folded rearward from a front end edge of the bottom wall in the connecting tube portion and a contact point portion provided at a position behind the fulcrum portion to contact the male terminal, the auxiliary spring is disposed at a position behind the fulcrum portion and below the contact point portion, the auxiliary spring includes a protrusion projecting in a direction intersecting the front-rear direction, and the protrusion and an inner surface of the upper wall are visually confirmable through the front opening of the connecting tube portion.

According to the present disclosure, it is possible to inspect the arrangement of an auxiliary spring in a connecting tube portion.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
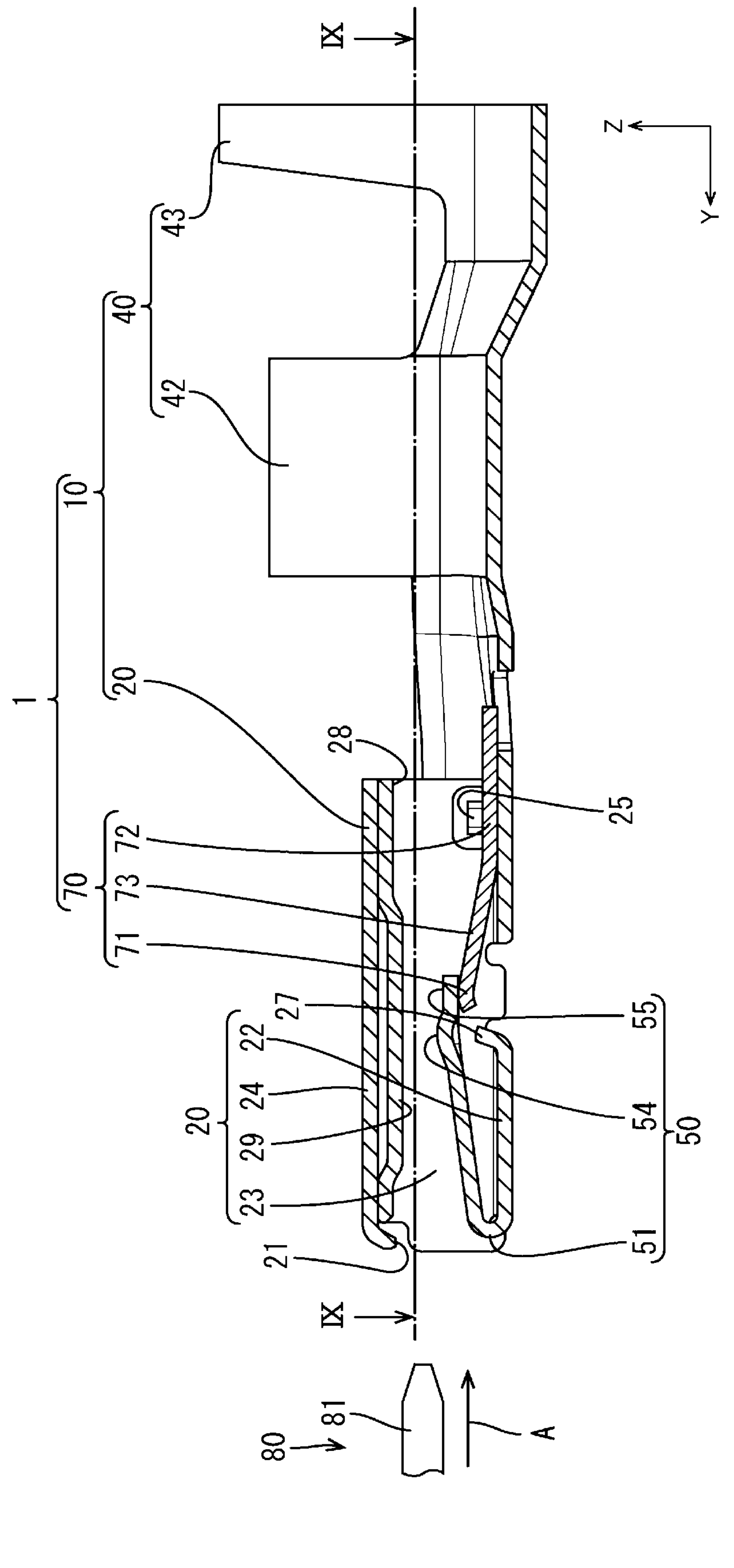
FIG. 1 is a section along I-I in FIG. 3 showing a female terminal according to a first embodiment.

In the following detailed description, reference is made to the accompanying drawings, which form a part hereof. The illustrative embodiments described in the detailed description, drawings, and claims are not meant to be limiting. Other embodiments may be utilized, and other changes may be made, without departing from the spirit or scope of the subject matter presented here.

Description of Embodiments of Present Disclosure

First, embodiments of the present disclosure are listed and described.

(1) The present disclosure is directed to a female terminal to be connected to a male terminal, the female terminal being provided with a connecting tube portion extending in a front-rear direction, the male terminal being inserted into the connecting tube portion, a resilient contact piece provided in the connecting tube portion, the resilient contact piece resiliently contacting the male terminal, and an auxiliary spring disposed in the connecting tube portion, the auxiliary spring biasing the resilient contact piece toward the male terminal by contacting the resilient contact piece, wherein the connecting tube portion has a bottom wall, an upper wall facing the bottom wall and a front opening open forward, the resilient contact piece includes a fulcrum portion folded rearward from a front end edge of the bottom wall in the connecting tube portion and a contact point portion provided at a position behind the fulcrum portion to contact the male terminal, the auxiliary spring is disposed at a position behind the fulcrum portion and below the contact point portion, the auxiliary spring includes a protrusion projecting in a direction intersecting the front-rear direction, and the protrusion and an inner surface of the upper wall are visually confirmable through the front opening of the connecting tube portion.

An interval between the protrusion of the auxiliary spring and the inner surface of the upper wall can be measured through the front opening by an optical method. In this way, the relative position of the auxiliary spring with respect to the inner surface of the upper wall can be easily inspected.

(2) Preferably, the connecting tube portion has a rear opening open rearward, and a laser beam irradiated into the front opening of the connecting tube portion from front is emitted from the rear opening.

The laser beam irradiated from a laser beam irradiating device arranged in front of the connecting tube portion is irradiated into the front opening of the connecting tube portion, emitted from the rear opening of the connecting tube portion and received by a laser beam receiving device disposed behind the connecting tube portion. In this way, the relative position of the auxiliary spring with respect to the inner surface of the upper wall can be inspected by a laser beam.

(3) Preferably, the connecting tube portion has a side wall extending toward the upper wall from a side edge of the bottom wall, and a tip of the protrusion is located inwardly of the side wall.

Since the tip of the protrusion is protected by the side wall, the collision of the tip of the protrusion with external matters is suppressed.

(4) Preferably, the connecting tube portion has a side wall extending toward the upper wall from a side edge of the bottom wall, and a through hole penetrating through the side wall is formed at a position of the side wall corresponding to the protrusion, and the auxiliary spring is suppressed from being excessively deflected and deformed by the protrusion abutting on a hole edge part of the through hole.

The auxiliary spring is suppressed from being excessively defected and deformed by the through hole.

(5) Preferably, a tip of the protrusion is located inwardly of an outer surface of the side wall.

Since the tip of the protrusion does not project outwardly of the side wall, the collision of the tip of the protrusion with external matters is suppressed.

(6) Preferably, the resilient contact piece includes an abutting portion configured to abut on the auxiliary spring at a position behind the contact point portion, the auxiliary spring includes a biasing portion for biasing the resilient contact piece by abutting on the abutting portion, and the protrusion is provided at a position of the auxiliary spring behind the biasing portion.

Since the abutting portion to be biased by the auxiliary spring serves as a point of effort, the contact point portion serves as a point of load and the fulcrum portion serves as a fulcrum in the resilient contact piece, a force larger than a force applied to the abutting portion is applied to the contact point portion by the principle of leverage. In this way, the electrical connection reliability of the male terminal and the female terminal can be improved.

Further, the biasing portion for biasing the resilient contact piece of the auxiliary spring is possibly deformed by receiving a force from the resilient contact piece. By providing the protrusion at the position behind this biasing portion, relative positions of the auxiliary spring and the upper wall can be precisely inspected.

(7) Preferably, the auxiliary spring separate from the connecting tube portion is fixed in the connecting tube portion.

Since the auxiliary spring can be formed of a material different from a material constituting the connecting tube portion, the strength design of the auxiliary spring can be freely changed. If the auxiliary spring is, for example, formed of a material having a larger strength than the material constituting the connecting tube portion, a contact pressure between the male terminal and the resilient contact piece can be improved, wherefore the electrical connection reliability of the male terminal and the female terminal can be improved.

Details of Embodiments of Present Disclosure

Hereinafter, embodiments of the present disclosure are described. The present disclosure is not limited to these illustrations and is intended to be represented by claims and include all changes in the scope of claims and in the meaning and scope of equivalents.

First Embodiment

A first embodiment of the present disclosure is described with reference to FIGS. 1 to 9. As shown in FIG. 1, a female terminal 1 in this embodiment is connected to a male terminal 80 including a tab 81 (only the tab 81 is shown). The female terminal 1 includes a terminal body 10 and an auxiliary spring 70 formed separately from the terminal body 10 and mounted in the terminal body 10. In the following description, a direction indicated by an arrow Z is referred to as an upward direction, a direction indicated by an arrow Y is referred to as a forward direction and a direction indicated by an arrow X is referred to as a leftward direction. Further, for a plurality of identical members, only some members may be denoted by a reference sign and the other members may not be denoted by the reference sign.

Figure 2:
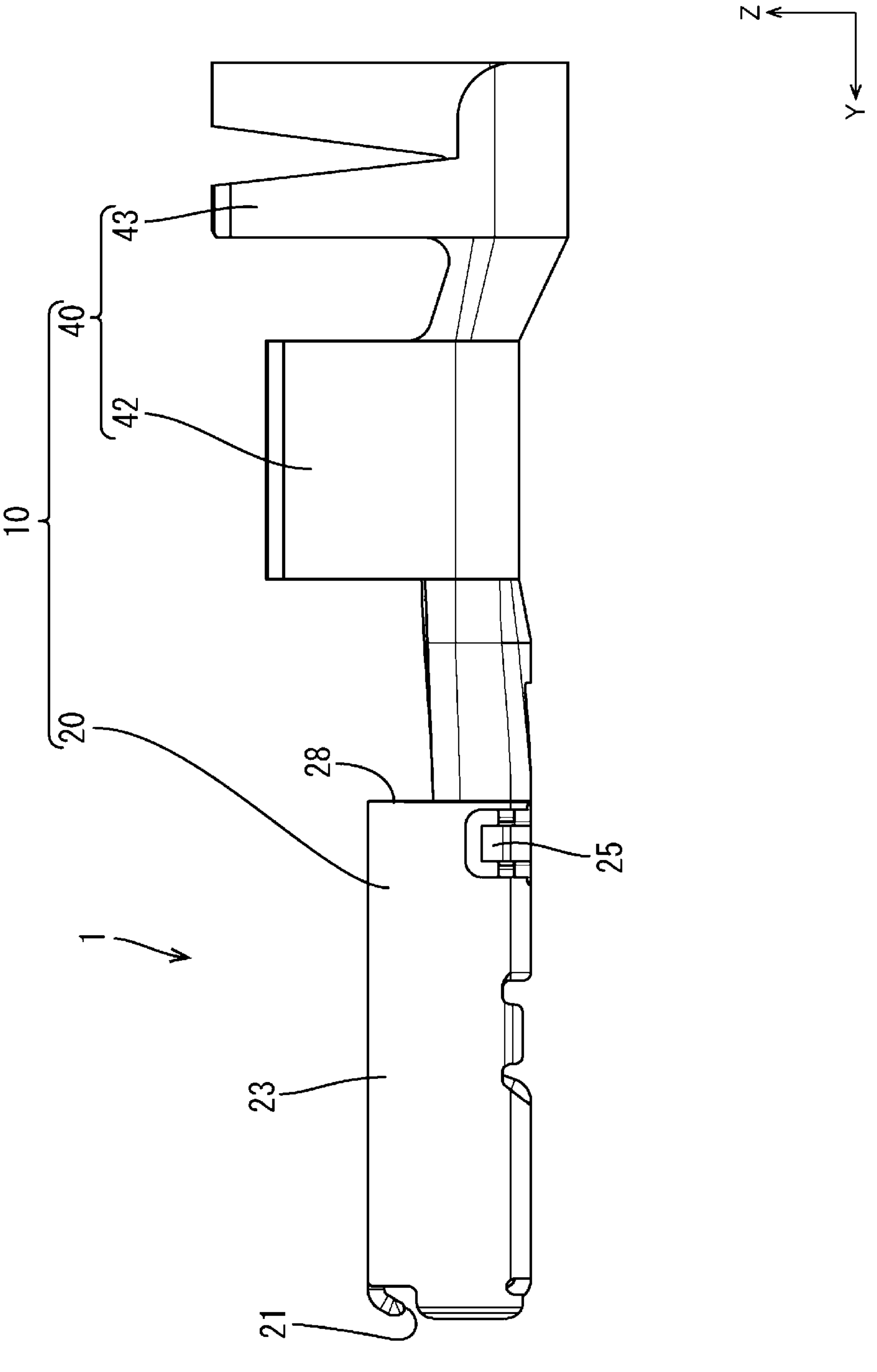
FIG. 2 is a side view showing the female terminal.
Figure 3:
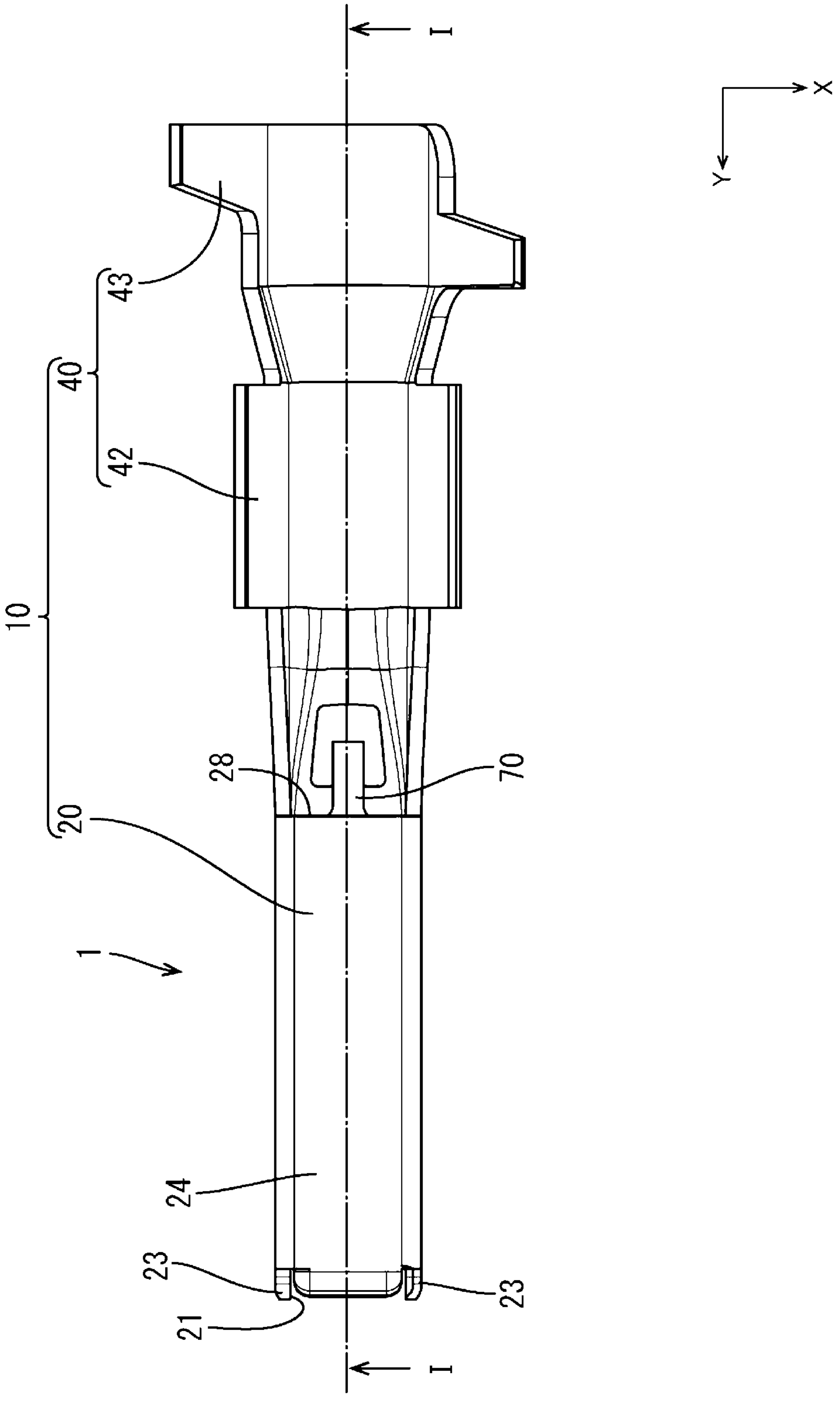
FIG. 3 is a plan view showing the female terminal.

The terminal body 10 is formed by press-working a metal plate material into a predetermined shape. An arbitrary metal such as copper, copper alloy, aluminum or aluminum alloy can be appropriately selected as a metal constituting the terminal body 10. As shown in FIGS. 2 and 3, the terminal body 10 is formed into a shape elongated in a front-rear direction. As shown in FIG. 1, a connecting tube portion 20 into which the tab 81 of the male terminal 80 is inserted from a direction indicated by an arrow A is formed in a substantially front half region of the terminal body 10, and a wire connecting portion 40 to be connected to a wire (not shown) is formed in a substantially rear half region.

Figure 4:
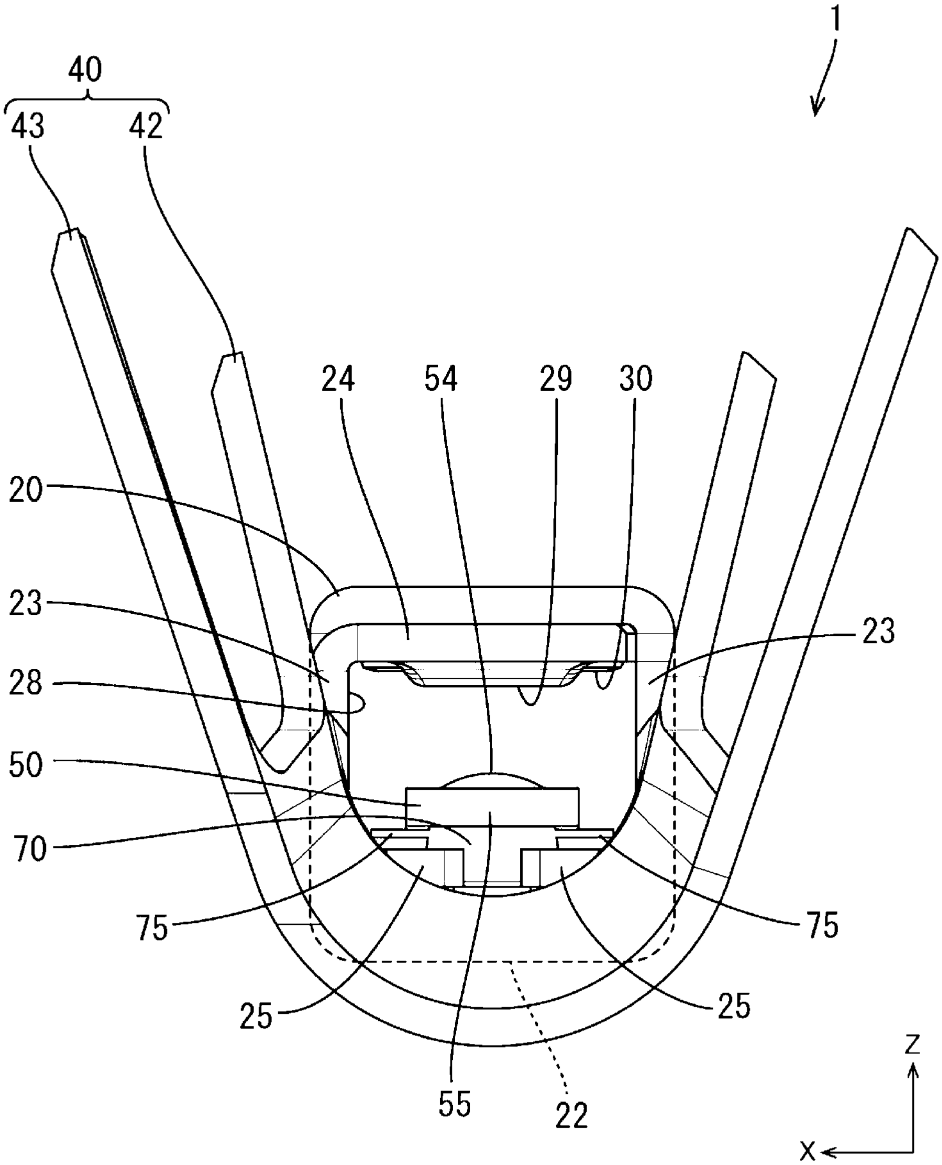
FIG. 4 is a back view showing the female terminal.

As shown in FIG. 1, the connecting tube portion 20 is in the form of a rectangular tube elongated in the front-rear direction and a front opening 21, through which the male terminal 80 is inserted, is provided to be open forward in the front end of the connecting tube portion 20. A rear end part of the connecting tube portion 20 is open rearward and serves as a rear opening 28. As shown in FIG. 4, the connecting tube portion 20 includes a bottom wall 22, a pair of side walls 23 rising upward from both left and right side edges of the bottom wall 22 and an upper wall 24 disposed to face the bottom wall 22 between the upper ends of the pair of side walls 23. The upper wall 24 according to this embodiment is formed by being bent from an upper end part of one side wall 23 toward an upper end part of the other side wall 23. A rib 29 projecting downward and extending in the front-rear direction is formed on a lower surface 30 of the upper wall 24. As shown in FIG. 4, the rib 29 is formed in a region of the lower surface 30 of the upper wall 24 except both left and right end parts.

As shown in FIGS. 2 and 3, the wire connecting portion 40 includes a wire barrel portion 42 to be crimped to a core wire (not shown) of the wire and an insulation barrel portion 43 to be crimped to an insulation coating (not shown) of the wire.

As shown in FIG. 1, a resilient contact piece 50 is disposed inside the connecting tube portion 20. The resilient contact piece 50 is formed by being folded rearward from the front end edge of the bottom wall 22. A part folded from the front end edge of the bottom wall 22 serves as a fulcrum portion 51. The resilient contact piece 50 is deflected and deformed in the vertical direction with this fulcrum portion 51 as a fulcrum.

The resilient contact piece 50 extends up to a substantially center position of the connecting tube portion 20 in the front-rear direction. A contact point portion 54 projecting upward is formed at a position near a rear end part of the resilient contact piece 50. The contact point portion 54 resiliently contacts the tab 81 of the male terminal 80 from below. In this way, the tab 81 is sandwiched between the contact point portion 54 of the resilient contact piece 50 and the rib 29 of the upper wall 24, whereby the male terminal 80 and the female terminal 1 are electrically connected. In a state where the tab 81 is not inserted in the connecting tube portion 20, the contact point portion 54 and the rib 29 are facing each other.

A part of the resilient contact piece 50 behind the contact point portion 54 serves as an abutting portion 55 which abuts on the auxiliary spring 70 to be described later from above.

The auxiliary spring 70 is formed by press-working a plate material made of metal different from the metal constituting the terminal body 10 into a predetermined shape. In the first embodiment, a stainless steel is used as the metal constituting the auxiliary spring 70. In the first embodiment, an elastic modulus of the metal constituting the auxiliary spring 70 is larger than that of the metal constituting the terminal body 10. The auxiliary spring 70 is in the form of a plate elongated in the front-rear direction as a whole.

Figure 5:
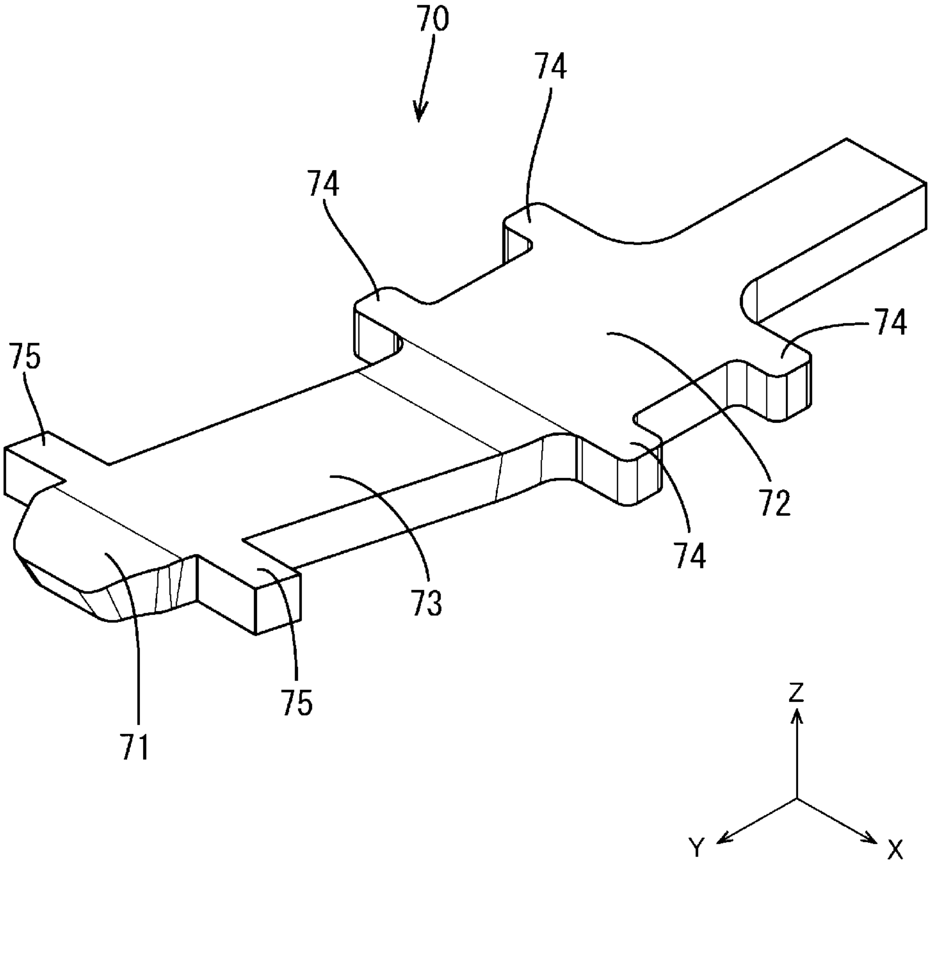
FIG. 5 is a perspective view showing an auxiliary spring.

As shown in FIG. 1, with the auxiliary spring 70 placed on the bottom wall 22, a front end part of the auxiliary spring 70 is located substantially in a center of the connecting tube portion 20 in the front-rear direction. The front end part of the auxiliary spring 70 serves as a biasing portion 71 for biasing the resilient contact piece 50 upward by abutting on the abutting portion 55 of the resilient contact piece 50 from below when the resilient contact piece 50 is resiliently deformed downward. In this way, the resilient contact piece 50 is biased in a direction toward the tab 81. When the resilient contact piece 50 is in a natural state, a rear end part of the resilient contact piece 50 and the biasing portion 71 of the auxiliary spring 70 may be separated or may be in contact. As shown in FIG. 5, the biasing portion 71 is formed into a shape somewhat tapered toward a front side.

As shown in FIG. 1, a rear half of the auxiliary spring 70 serves as a placing portion 72 to be placed on the upper surface of the bottom wall 22 of the terminal body 10. The placing portion 72 is in contact with the upper surface of the bottom wall 22. A region between the biasing portion 71 and the placing portion 72 serves as an inclined portion 73 inclined upward toward the front side with the auxiliary spring 70 placed on the upper surface of the bottom wall 22.

As shown in FIG. 5, the placing portion 72 is formed with locking protrusions 74 projecting toward both left and right sides from both left and right side edges. Two locking protrusions 74 are formed side by on each side edge of the placing portion 72 while being spaced apart in the front-rear direction.

Figure 6:
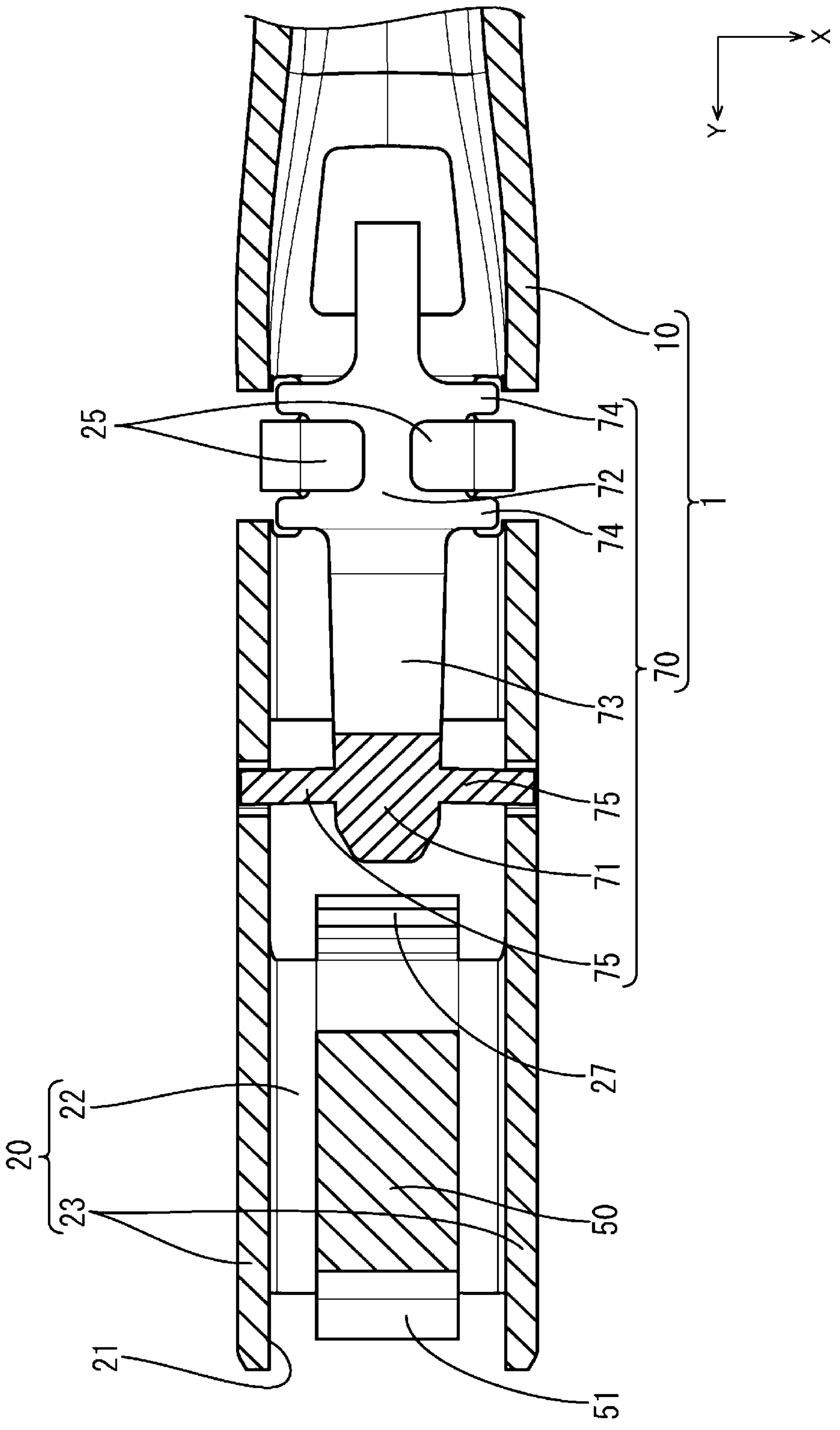
FIG. 6 is a section along IX-IX in FIG. 1 enlargedly showing the female terminal.
Figure 7:
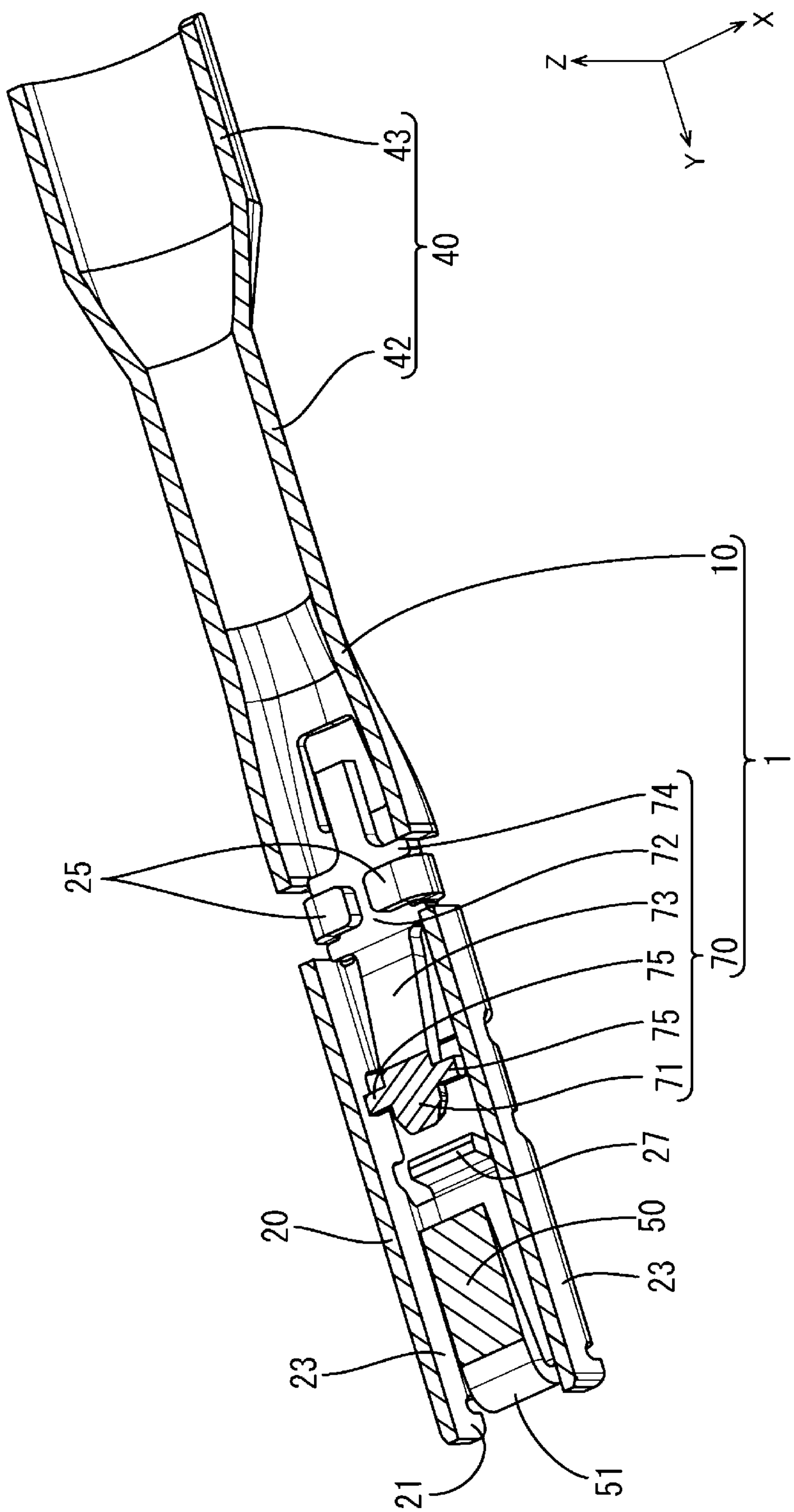
FIG. 7 is a perspective view in section along IX-IX in FIG. 1 showing the female terminal viewed obliquely from above.

As shown in FIGS. 6 and 7, the two side walls 23 in the connecting tube portion 20 are formed with crimping portions 25 projecting inwardly of the connecting tube portion 20 and to be crimped to the placing portion 72 of the auxiliary spring 70. The crimping portions 25 are formed by cutting and raising the side walls 23 of the connecting tube portion 20. The crimping portions 25 are crimped between the two front and rear locking protrusions 74 provided on the both side edges of the placing portion 72. In this way, the auxiliary spring 70 is mounted in the terminal body 10 with forward and rearward movements restricted. The two crimping portions 25 are disposed with a tiny gap formed between the tips thereof without overlapping each other.

As shown in FIG. 1, the bottom wall 22 of the connecting tube portion 20 is provided with an excessive deflection suppressing piece 27 projecting upward at a position below the resilient contact piece 50 and in front of the biasing portion 71 of the auxiliary spring 70. The excessive deflection suppressing piece 27 is formed by cutting and raising the bottom wall 22. A gap is formed between an upper end part of the excessive deflection suppressing piece 27 and a lower edge part of the resilient contact piece 50 in the natural state. Also with the tab 81 of the male terminal 80 inserted in the connecting tube portion 20, a gap is formed between the upper end part of the excessive deflection suppressing piece 27 and the lower edge part of the resilient contact piece 50. If the resilient contact piece 50 is pressed excessively downward by the tab 81 of the male terminal 80, the upper end part of the excessive deflection suppressing piece 27 abuts on the lower edge part of the resilient contact piece 50 from below, thereby suppressing the resilient contact piece 50 from being deflected excessively downward. Note that the natural state of the resilient contact piece 50 means a state where no external force is applied to the resilient contact piece 50.

The excessive deflection suppressing piece 27 does not contact the auxiliary spring 70 since being provided in front of the biasing portion 71 of the auxiliary spring 70.

As shown in FIG. 5, the auxiliary spring 70 includes two protrusions 75 respectively projecting in a lateral direction (an example of a direction intersecting the front-rear direction) at positions somewhat behind the biasing portion 71 and near a front end part of the inclined portion 73. The protrusion 75 has a rectangular shape when viewed from above.

Figure 8:
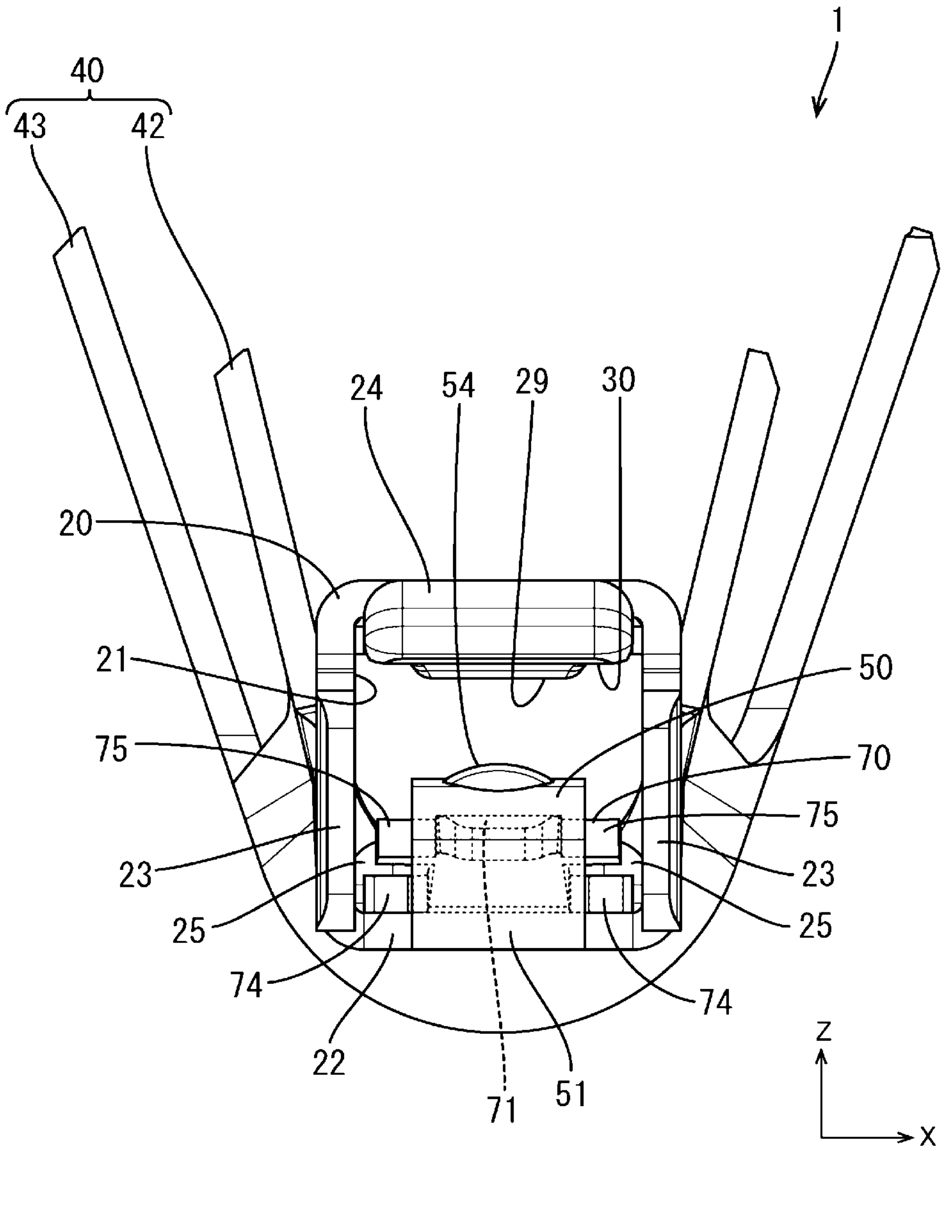
FIG. 8 is a front view of the female terminal.

As shown in FIG. 8, the tips of the two protrusions 75 project in the lateral direction further than both left and right side edges of the resilient contact piece 50. The lower surface 30 of the upper wall 24 is located above the protrusions 75 and the protrusions 75 and the lower surface 30 of the upper wall 24 are facing each other.

As shown in FIG. 7, the tips of the two protrusions 75 are located inwardly of the inner surfaces of the side walls 23. Gaps are formed between the tips of the protrusions 75 and the inner surfaces of the side walls 23. The tips of the protrusions 75 are covered by the side walls 23 and not exposed to the outside of the connecting tube portion 20.

As shown in FIG. 8, when the connecting tube portion 20 is viewed from front, an opening edge part of the front opening 21 can be visually confirmed. Specifically, front end parts of the two side walls 23, that of the bottom wall 22 and that of the upper wall 24 can be visually confirmed. Further, the inside of the connecting tube portion 20 can be visually confirmed through the front opening 21. Specifically, the fulcrum portion 51 and the contact point portion 54 of the resilient contact piece 50 can be visually confirmed. Further, the lower surface 30 and the rib 29 of the upper wall 24 can be visually confirmed. The two protrusions 75 can be visually confirmed at positions below the contact point portion 54 of the resilient contact piece 50 and to the left and right of the resilient contact piece 50.

Since the biasing portion 71 of the auxiliary spring 70 is located behind the resilient contact piece 50, the biasing portion 71 cannot be visually confirmed from front.

Note that visual confirmability means that the position, size, shape, color or the like of an object can be measured by optical equipment such as a camera or a light receiving element.

As shown in FIG. 4, when the connecting tube portion 20 is viewed from behind, a rear end part of the upper wall 24 and parts near upper end parts of rear end parts of the two side walls 23, out of an opening edge part of the rear opening 28, can be visually confirmed. Further, the inside of the connecting tube portion 20 can be visually confirmed through the rear opening 28. Specifically, the contact point portion 54 and the abutting portion 55 of the resilient contact piece 50 can be visually confirmed. Further, the lower surface 30 and the rib 29 of the upper wall 24 can be visually confirmed. The two protrusions 75 can be visually confirmed at the positions below the contact point portion 54 of the resilient contact piece 50 and to the left and right of the resilient contact piece 50.

Figure 9:
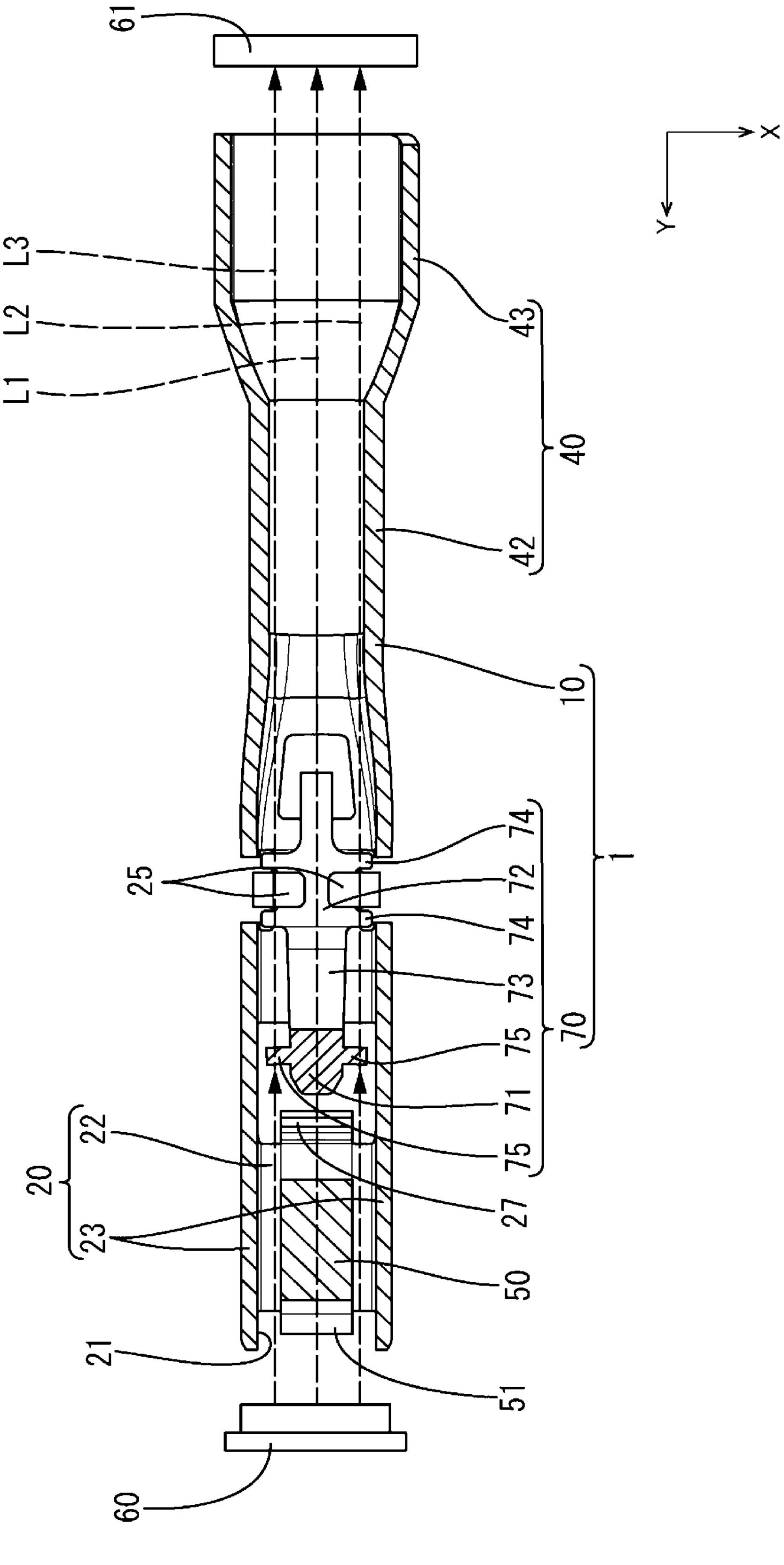
FIG. 9 is a section along IX-IX in FIG. 1 showing the female terminal.

As described above, the lower surface 30 and the rib 29 of the upper wall 24, the contact point portion 54 of the resilient contact piece 50 and the protrusions 75 of the auxiliary spring 70 can be visually confirmed through the front opening 21, and the rib 29 of the upper wall 24, the contact point portion 54 of the resilient contact piece 50 and the protrusions 75 of the auxiliary spring 70 can be visually confirmed through the rear opening 28. In this way, as shown in FIG. 9, laser beams L1, L2 and L3 irradiated to the inside of the front opening 21 of the connecting tube portion 20 from a laser beam irradiating device 60 arranged in front of the connecting tube portion 20 can be emitted rearward from the rear opening 28 of the connecting tube portion 20 through the connecting tube portion 20 and reach a laser beam receiving device 61 arranged behind the connecting tube portion 20. As a result, an interval between the rib 29 of the upper wall 24 of the connecting tube portion 20 and the contact point portion 54 of the resilient contact piece 50 can be measured and intervals between the lower surface 30 of the upper wall 24 of the connecting tube portion 20 and the protrusions 75 of the auxiliary spring 70 can be measured by the laser beams L1, L2 and L3 passing inside the connecting tube portion 20.

Functions and Effects of First Embodiment

Next, functions and effects of the first embodiment are described. As shown in FIG. 9, the laser beam irradiating device 60 is disposed in front of the female terminal 1 and the laser beam receiving device 61 is disposed behind the female terminal 1. The laser beams L1, L2 and L3 are irradiated toward the inside of the connecting tube portion 20 from the laser beam irradiating device 60.

As shown in FIG. 9, the laser beam L1 is irradiated which passes near a center of the connecting tube portion 20 in the lateral direction. This laser beam L1 is irradiated to the contact point portion 54 of the resilient contact piece 50 and the rib 29 of the upper wall 24. The laser beam L1 passed inside the connecting tube portion 20 is received by the laser beam receiving device 61, whereby the interval between the contact point portion 54 of the resilient contact piece 50 and the rib 29 of the upper wall 24 is measured. In this way, relative positions of the rib 29 of the upper wall 24 and the resilient contact piece 50 can be inspected in the connecting tube portion 20.

As shown in FIG. 9, the laser beams L2, L3 are irradiated which pass a position near a left end part and a position near a right end part inside the connecting tube portion 20. These laser beams L2, L3 are irradiated to the protrusions 75 projecting from the both left and right side edges of the auxiliary spring 70 and the lower surface 30 of the upper wall 24. The laser beams L2, L3 passed inside the connecting tube portion 20 are received by the laser beam receiving device 61, whereby the intervals between the protrusions 75 of the auxiliary spring 70 and the lower surface 30 of the upper wall 24 are measured. In this way, relative positions of the lower surface 30 of the upper wall 24 and the auxiliary spring 70 can be inspected in the connecting tube portion 20.

According to this embodiment, the auxiliary spring 70 includes the two protrusions 75 respectively projecting from the both left and right side edges. In this way, whether or not the auxiliary spring 70 is twisted can be inspected by measuring the intervals between the respective protrusions 75 and the lower surface 30 of the upper wall 24.

Further, according to this embodiment, the connecting tube portion 20 includes the side walls 23 extending toward the upper wall 24 from the side edges of the bottom wall 22 and the tips of the protrusions 75 are located inwardly of the side walls 23. Since the tips of the protrusions 75 are protected by the side walls 23 in this way, the interference of the tips of the protrusions 75 with external matters is suppressed.

Further, according to this embodiment, the resilient contact piece 50 includes the abutting portion 55 configured to abut on the auxiliary spring 70 at the position behind the contact point portion 54, the auxiliary spring 70 includes the biasing portion 71 for biasing the resilient contact piece 50 by abutting on the abutting portion 55, and the protrusions 75 are provided at the positions of the auxiliary spring 70 behind the biasing portion 71.

Since the abutting portion 55 to be biased by the auxiliary spring 70 serves as a point of effort, the contact point portion 54 serves as a point of load and the fulcrum portion 51 serves as a fulcrum in the resilient contact piece 50, a force larger than a force applied to the abutting portion 55 is applied to the contact point portion 54 by the principle of leverage. In this way, the electrical connection reliability of the male terminal 80 and the female terminal 1 can be improved.

Further, the biasing portion 71 for biasing the resilient contact piece 50 of the auxiliary spring 70 is possibly deformed by receiving a force from the resilient contact piece 50. By providing the protrusions 75 at the positions behind this biasing portion 71, relative positions of the auxiliary spring 70 and the upper wall 24 can be precisely inspected.

Further, according to this embodiment, the auxiliary spring 70 separate from the connecting tube portion 20 is fixed in the connecting tube portion 20.

Since the auxiliary spring 70 can be formed of a material different from the material constituting the connecting tube portion 20, the strength design of the auxiliary spring 70 can be freely changed. In this way, if the auxiliary spring 70 is formed, for example, of a material having a larger strength than the material constituting the connecting tube portion 20, a contact pressure between the male terminal 80 and the resilient contact piece 50 can be increased, wherefore the electrical connection reliability of the male terminal 80 and the female terminal 1 can be improved.

Second Embodiment

Figure 10:
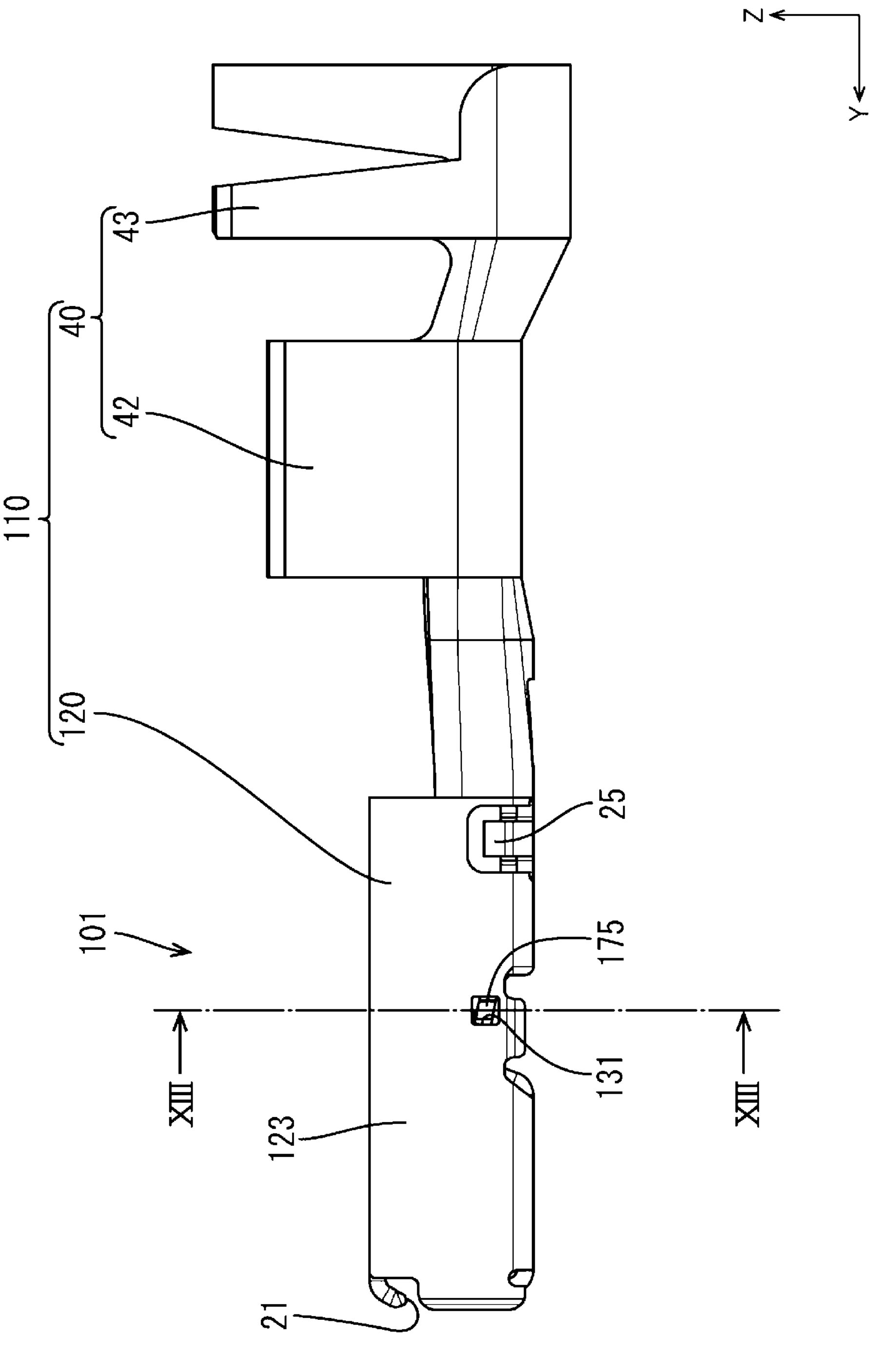
FIG. 10 is a side view showing a female terminal according to a second embodiment.
Figure 11:
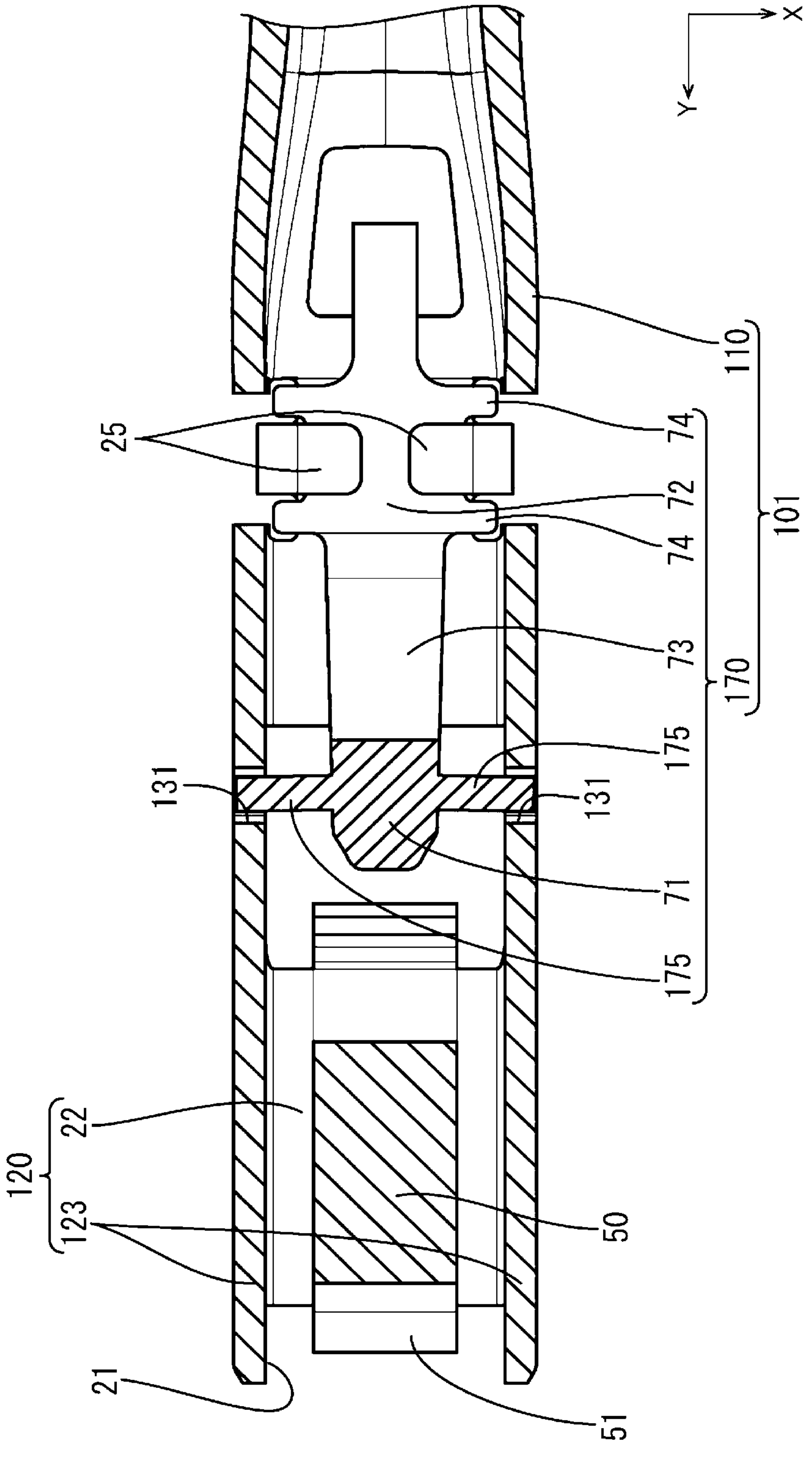
FIG. 11 is a partial enlarged section showing the female terminal.
Figure 12:
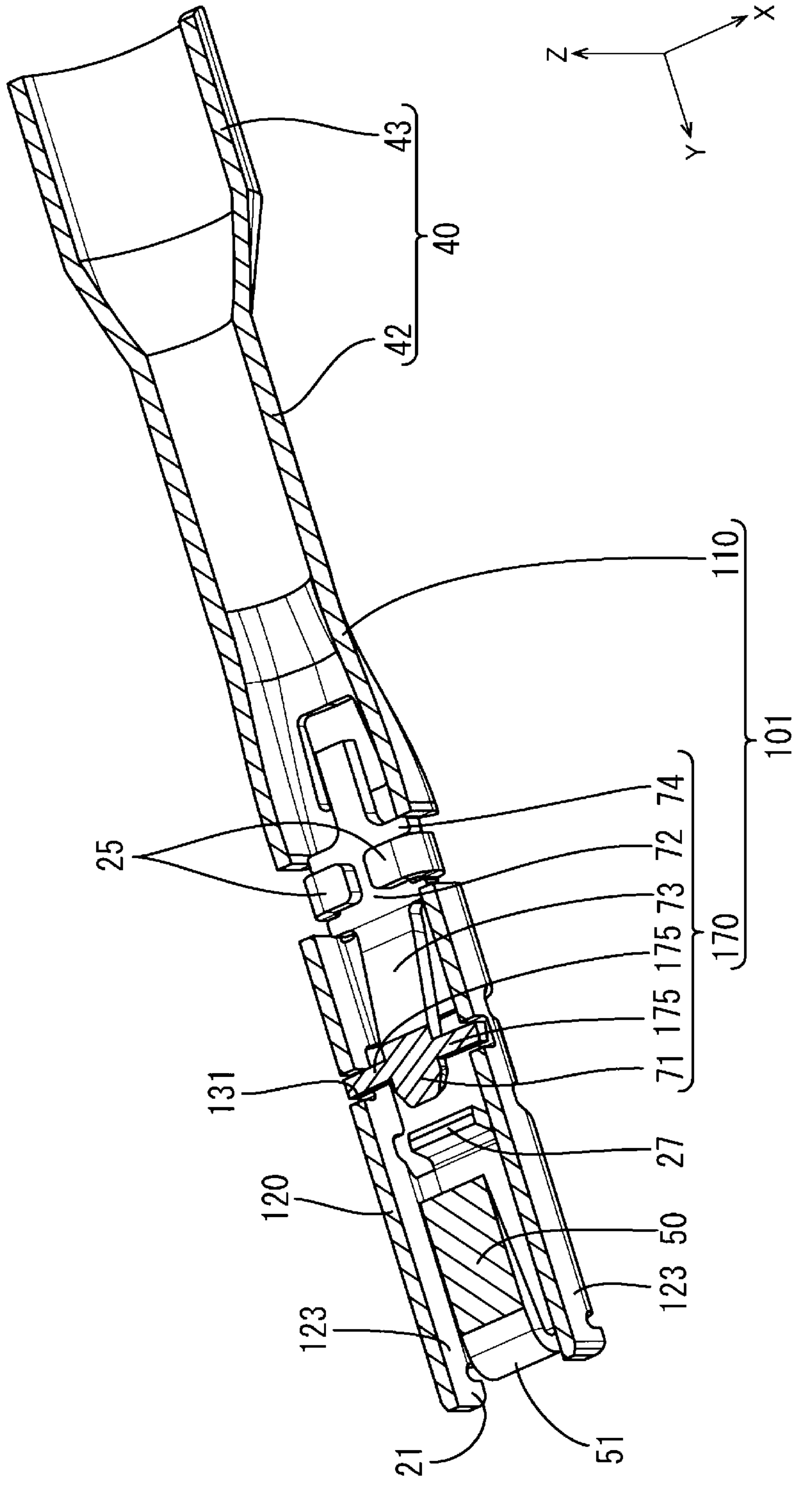
FIG. 12 is a perspective view in section showing the female terminal.

Next, a female terminal 101 according to a second embodiment of the present disclosure is described with reference to FIGS. 10 to 13. As shown in FIGS. 10, 11 and 12, side walls 123 of a connecting tube portion 120 respectively have through holes 131 penetrating through the side walls 123 in the lateral direction at positions to the left and right of protrusions 175 of an auxiliary spring 170. As shown in FIG. 10, the through hole 131 has a substantially rectangular shape when viewed from the lateral direction. The inner shape of the through hole 131 is larger than the outer shape of the tip of the protrusion 175.

Figure 13:
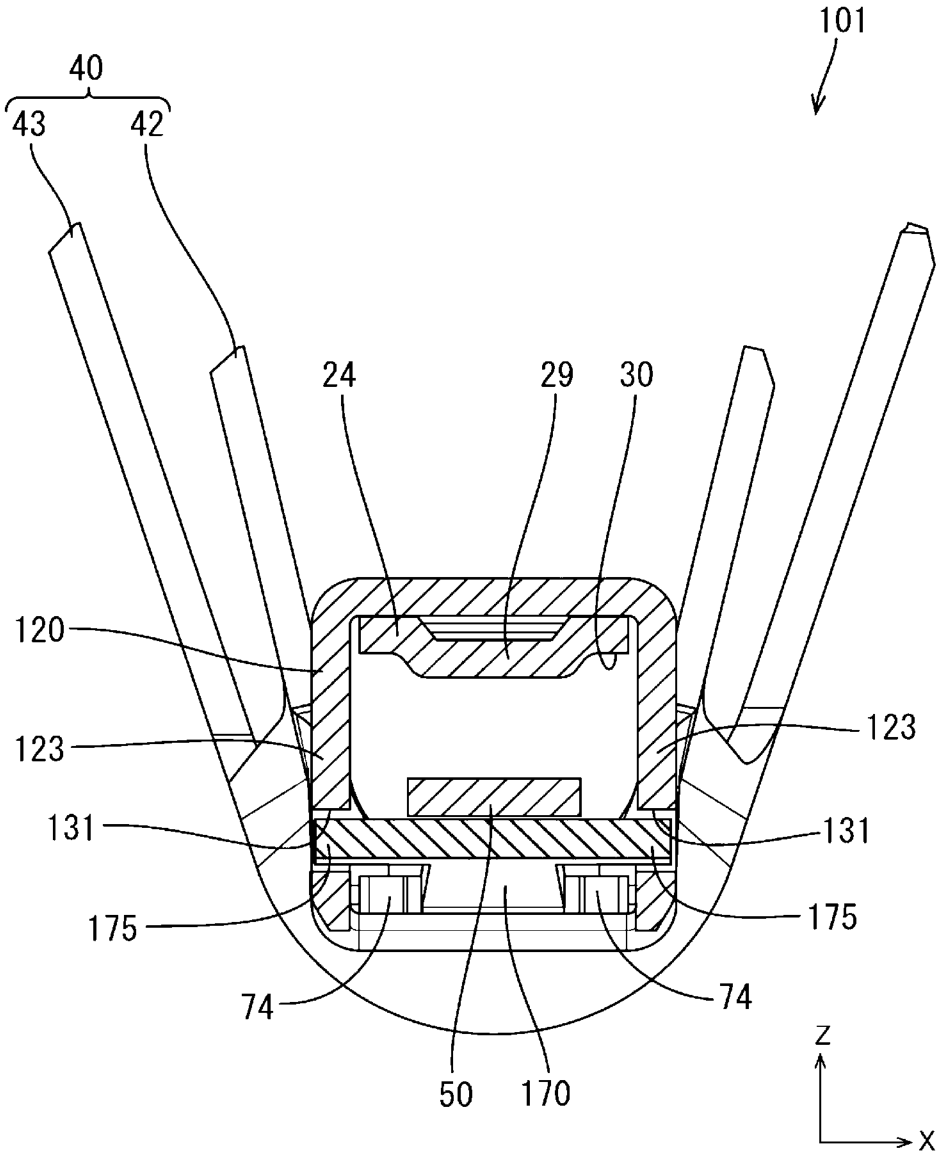
FIG. 13 is a section along XIII-XIII in FIG. 10.

As shown in FIGS. 11 and 13, the tips of the protrusions 175 are located inside the through holes 131. In particular, the tips of the protrusions 175 are located between the inner surfaces of the side walls 123 and the outer surfaces of the side walls 123. In this way, the tips of the protrusions 175 are prevented from projecting outwardly of the outer surfaces of the side walls 123.

By the abutment of the protrusions 175 of the auxiliary spring 70 on hole edge parts of the through holes 131, the auxiliary spring 170 is suppressed from being excessively deflected and deformed.

Since the configuration other than the above is substantially similar to that of the first embodiment, the same members are denoted by the same reference signs and repeated description is omitted.

According to this embodiment, the tips of the protrusions 175 are located inwardly of the outer surfaces of the side walls 123. Since the tips of the protrusions 175 do not project outwardly of the side walls 123 in this way, the interference of the tips of the protrusions 175 with external matters is suppressed.

Other Embodiments (1) The inside of the connecting tube portion 20 may be imaged from front of the connecting tube portion 20, for example, by a camera and the intervals between the lower surface 30 of the upper wall 24 and the protrusions 75 of the auxiliary spring 70 may be measured by an image analysis. In this case, the connecting tube portion 20 may not have the rear opening 28 and the rear end part of the connecting tube portion 20 may be closed by a certain member.

(2) One protrusion 75 may be provided on one of the both left and right side edges of the auxiliary spring 70. Further, the auxiliary spring 70 may include three or more protrusions 75.

(3) The auxiliary spring may be formed integrally to the terminal body 10.

(4) The protrusion 75 may project in an arbitrary direction intersecting the front-rear direction from the side edge of the auxiliary spring 70 and may, for example, project obliquely upward to the left, obliquely upward to the right, obliquely downward to the left or obliquely downward to the right.

(5) The shape of the protrusion 75 is arbitrary and may be a tapered shape when viewed from above or may be shaped to have an arcuately rounded tip when viewed from above.

From the foregoing, it will be appreciated that various exemplary embodiments of the present disclosure have been described herein for purposes of illustration, and that various modifications may be made without departing from the scope and spirit of the present disclosure. Accordingly, the various exemplary embodiments disclosed herein are not intended to be limiting, with the true scope and spirit being indicated by the following claims.

What is claimed is:

1. A female terminal to be connected to a male terminal, comprising:

a connecting tube portion extending in a front-rear direction, the male terminal being inserted into the connecting tube portion;

a resilient contact piece provided in the connecting tube portion, the resilient contact piece resiliently contacting the male terminal; and an auxiliary spring disposed in the connecting tube portion, the auxiliary spring biasing the resilient contact piece toward the male terminal by contacting the resilient contact piece, wherein:

the connecting tube portion has a bottom wall, an upper wall facing the bottom wall, a side wall extending toward the upper wall from a side edge of the bottom wall, and a front opening open forward, the resilient contact piece includes a fulcrum portion folded rearward from a front end edge of the bottom wall in the connecting tube portion and a contact point portion provided at a position behind the fulcrum portion to contact the male terminal, the auxiliary spring is disposed at a position behind the fulcrum portion and below the contact point portion, the auxiliary spring includes a protrusion projecting in a direction intersecting the front-rear direction, the protrusion having a tip located inwardly of an inner surface of the side wall, and the protrusion and an inner surface of the upper wall are visually confirmable through the front opening of the connecting tube portion.

2. The female terminal of claim 1, wherein:

the connecting tube portion has a rear opening open rearward, and a laser beam irradiated into the front opening of the connecting tube portion from front is emitted from the rear opening.

3. The female terminal of claim 1, wherein:

the resilient contact piece includes an abutting portion configured to abut on the auxiliary spring at a position behind the contact point portion, the auxiliary spring includes a biasing portion for biasing the resilient contact piece by abutting on the abutting portion, and the protrusion is provided at a position of the auxiliary spring behind the biasing portion.

4. The female terminal of claim 1, wherein the auxiliary spring is structurally separate from the connecting tube portion, and wherein the auxiliary spring is fixed to the connecting tube portion.

* * * * *